(12) United States Patent
McFarland et al.

(10) Patent No.: US 7,805,709 B2
(45) Date of Patent: Sep. 28, 2010

(54) SYSTEM AND METHOD FOR BYPASSING EXECUTION OF AN ALGORITHM

(75) Inventors: Bernard M. McFarland, Warren, IN (US); Larry D. Burkholder, Kokomo, IN (US); William James Allen, Carmel, IN (US); Richard J. Skertic, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 1160 days.

(21) Appl. No.: 11/441,839

(22) Filed: May 26, 2006

(65) Prior Publication Data

US 2007/0011242 A1    Jan. 11, 2007

Related U.S. Application Data

(60) Provisional application No. 60/685,663, filed on May 27, 2005.

(51) Int. Cl.
    *G06F 9/44* (2006.01)
(52) U.S. Cl. ............ 717/131; 717/124; 717/103; 717/127; 712/42; 712/43; 709/205; 713/161; 713/170
(58) Field of Classification Search ............ 717/103, 717/126–128, 131; 713/161, 170; 712/2, 712/29, 30, 42, 43; 709/205
    See application file for complete search history.

(56) References Cited

U.S. PATENT DOCUMENTS

| | | | | |
|---|---|---|---|---|
| 4,216,528 A | * | 8/1980 | Robertson | 700/95 |
| 4,525,599 A | * | 6/1985 | Curran et al. | 713/190 |
| 4,817,146 A | * | 3/1989 | Szczutkowski et al. | 380/261 |
| 4,876,644 A | * | 10/1989 | Nuechterlein et al. | 712/30 |
| 5,019,971 A | * | 5/1991 | Lefsky et al. | 714/5 |
| 5,537,562 A | * | 7/1996 | Gallup et al. | 712/234 |
| 5,551,033 A | * | 8/1996 | Foster et al. | 713/100 |
| 5,561,770 A | * | 10/1996 | de Bruijn et al. | 709/225 |
| 5,598,571 A | * | 1/1997 | Gallup et al. | 712/9 |
| 5,740,463 A | * | 4/1998 | Oshima et al. | 712/11 |
| 5,875,304 A | * | 2/1999 | Winter et al. | 709/231 |
| 5,881,231 A | * | 3/1999 | Takagi et al. | 709/212 |

(Continued)

FOREIGN PATENT DOCUMENTS

EP    1 429 245    6/2004

OTHER PUBLICATIONS

Title: An Error propagation algorithm for continuous systems with multiple operational modes, author: Ronald W. Scott, source: IEEE, publication date: 1977.*

(Continued)

*Primary Examiner*—Chameli C Das
(74) *Attorney, Agent, or Firm*—Jimmy L. Funke

(57) ABSTRACT

A system and a method for bypassing execution of an algorithm are provided. The method includes associating a first algorithm of a first computer with a second algorithm of a second computer, utilizing the first computer, wherein execution of the second algorithm by the second computer is to be bypassed. The method further includes determining when the second computer has a predetermined state. The method further includes stopping execution of the second algorithm on the second computer when the second computer has the predetermined state. The method further includes initiating execution of the first algorithm on the first computer when the second computer has the predetermined state.

4 Claims, 9 Drawing Sheets

U.S. PATENT DOCUMENTS

| | | | |
|---|---|---|---|
| 6,163,858 A | 12/2000 | Bodamer | |
| 6,243,755 B1 * | 6/2001 | Takagi et al. | 709/229 |
| 6,523,169 B1 | 2/2003 | Glunz | |
| 2002/0174394 A1 * | 11/2002 | Ledford et al. | 714/733 |
| 2004/0163078 A1 * | 8/2004 | Correa et al. | 717/130 |
| 2008/0016226 A1 * | 1/2008 | Holden et al. | 709/227 |

OTHER PUBLICATIONS

Title: Offsets for Scheduling Mode Changes, author: Real et al, source: IEEE, publication date: 2001.*

Machine Translation of EP 1429245, publication date: Jun. 16, 2004.*

* cited by examiner

SYSTEM AND METHOD FOR BYPASSING EXECUTION OF AN ALGORITHM

CROSS REFERENCE TO RELATED APPLICATIONS

The application claims the benefit of U.S. Provisional application, Ser. No. 60/685,663, filed May 27, 2005, the contents of which are incorporated herein by reference thereto.

TECHNICAL FIELD

The present application relates to a system and method for bypassing execution of an algorithm.

BACKGROUND

A computer system has been developed that allows a user to test algorithms by bypassing an algorithm on a first computer and executing another algorithm on a second computer instead of the algorithm on the first computer. A problem associated with the computer system is that the bypass functionality can be initiated at any time by a user regardless of the operational state of the first computer. As a result, an algorithm executing on the first computer can be stopped at an indeterminate location in the code during a bypass operation, which can result in one or more devices controlled by the first computer being degraded or damaged.

Accordingly, the inventors herein have recognized a need for an improved computer system that reduces and/or eliminates the above deficiencies.

SUMMARY OF THE INVENTION

A method for bypassing execution of an algorithm in accordance with an exemplary embodiment is provided. The method includes associating a first algorithm of a first computer with a second algorithm of a second computer, utilizing the first computer, wherein execution of the second algorithm by the second computer is to be bypassed. The method further includes determining when the second computer has a predetermined state. The method further includes stopping execution of the second algorithm on the second computer when the second computer has the predetermined state. The method further includes initiating execution of the first algorithm on the first computer when the second computer has the predetermined state.

A system for bypassing execution of an algorithm in accordance with another exemplary embodiment is provided. The system includes a first computer configured to allow a user to associate a first algorithm of a first computer with a second algorithm of a second computer, wherein execution of the second algorithm by the second computer is to be bypassed. The second computer is configured to determine when the second computer has a predetermined state. The second computer is further configured to stop execution of the second algorithm on the second computer when the second computer has the predetermined state. The first computer is further configured to initiate execution of the first algorithm on the first computer when the second computer has the predetermined state.

A method for setting operational modes of first and second algorithms in accordance with another exemplary embodiment is provided. The method includes transmitting a first message having a user ID and an algorithm ID from a first computer to a second computer. The user ID identifies the user. The algorithm ID identifies the second algorithm. The method further includes accessing a message transmission indicator indicating that the first message was transmitted from the first computer, utilizing the second computer. The method further includes comparing the user ID to a list of authorized user IDs to determine whether the user ID is valid. The method further includes comparing the algorithm ID to a list of valid algorithm IDs to determine whether the algorithm ID is valid. The method further includes setting the operational mode of the first algorithm associated with the first computer to a predetermined operational mode when the user ID is valid and the algorithm ID is valid. The method further includes setting the operational mode of the second algorithm associated with the second computer to the predetermined operational mode when the user ID is valid and the algorithm ID is valid.

A system for setting operational modes of first and second algorithms in accordance with another exemplary embodiment is provided. The system includes a first computer configured to transmit a first message having a user ID and an algorithm ID to a second computer. The user ID identifies the user. The algorithm ID identifies the second algorithm. The second computer is configured to access a message transmission indicator indicating that the first message was transmitted from the first computer. The second computer is further configured to compare the user ID to a list of authorized user IDs to determine whether the user ID is valid. The second computer is further configured to compare the algorithm ID to a list of valid algorithm IDs to determine whether the algorithm ID is valid. The first computer is further configured to set the operational mode of the first algorithm associated with the first computer to a predetermined operational mode when the user ID is valid and the algorithm ID is valid. The first computer is further configured to set the operational mode of the second algorithm associated with the second computer to the predetermined operational mode when the user ID is valid and the algorithm ID is valid.

A method for changing an operational mode of an algorithm between a tap mode and a bypass mode in accordance with another exemplary embodiment is provided. The method includes associating a first algorithm of a first computer with a second algorithm of a second computer, utilizing the first computer. The method further includes setting an operational mode of the first algorithm to the tap mode. The method further includes executing the first algorithm on the first computer wherein the first algorithm generates first resultant data that is observable, based on first input data. The method further includes executing the second algorithm on the second computer wherein the second algorithm generates second resultant data for controlling a device, based on either the first input data or second input data. The method further includes setting the operational mode of the first algorithm to the bypass mode, and executing the first algorithm on the first computer wherein the first algorithm generates third resultant data for controlling the device, based on the first input data, when the first resultant data satisfies predetermined criteria.

A system for changing an operational mode of an algorithm between a tap mode and a bypass mode in accordance with another exemplary embodiment is provided. The system includes a first computer configured to associate a first algorithm of the first computer with a second algorithm of a second computer. The first computer is further configured to set an operational mode of the first algorithm to the tap mode. The first computer is further configured to execute the first algorithm wherein the first algorithm generates first resultant data that is observable, based on first input data. The second computer is configured to execute the second algorithm wherein the second algorithm generates second resultant data for controlling a device, based on either the first input data or second input data. The first computer is further configured to set the operational mode of the first algorithm to the bypass mode, and to execute the first algorithm wherein the first algorithm generates third resultant data for controlling the device, based on the first input data, when the first resultant data satisfies predetermined criteria.

A method for synchronously executing a plurality of algorithms in accordance with another exemplary embodiment is provided. The method includes selecting a first plurality of algorithms having a first plurality of algorithm IDs utilizing a first computer. The first plurality of algorithms are associated with a second computer. The method further includes generating a first table having the first plurality of algorithm IDs. The first table is stored in a first memory associated with the first computer. The method further includes copying the first table to a second memory associated with the second computer when the second computer has a predetermined state such that a second table is stored in the second memory. The second table has the first plurality of algorithm IDs. The method further includes synchronously executing the first plurality of algorithms on the second computer to exchange input data with a second plurality of algorithms executing on the first computer. The second plurality of algorithms are identified by the first plurality of algorithm IDs stored in the second table. Each algorithm of the second plurality of algorithms is associated with the corresponding algorithm of the first plurality of algorithms. Each algorithm of the first plurality of algorithms receives resultant data from the corresponding algorithm of the second plurality of algorithms.

A system for synchronously executing a plurality of algorithms in accordance with another exemplary embodiment is provided. The system includes a first computer configured to select a first plurality of algorithms having a first plurality of algorithm IDs. The first plurality of algorithms are associated with a second computer. The first computer is further configured to generate a first table having the first plurality of algorithm IDs. The first table is stored in a first memory associated with the first computer. The first computer is further configured to copy the first table to a second memory associated with the second computer when the second computer has a predetermined state such that a second table is stored in the second memory. The second table has the first plurality of algorithm IDs. The second computer is configured to synchronously execute the first plurality of algorithms on the second computer to exchange input data with a second plurality of algorithms executing on the first computer. The second plurality of algorithms is identified by the first plurality of algorithm IDs stored in the second table. Each algorithm of the second plurality of algorithms is associated with the corresponding algorithm of the first plurality of algorithms. Each algorithm of the first plurality of algorithms receives resultant data from the corresponding algorithm of the second plurality of algorithms.

A method for executing a plurality of algorithms in accordance with another exemplary embodiment is provided. The method includes associating a first algorithm of a first computer with a second algorithm of a second computer, utilizing the first computer. The method further includes executing the first algorithm utilizing the first computer based on either input data received from the second algorithm or other data received from the second computer. The method further includes associating a third algorithm of the first computer with the second algorithm of the second computer, utilizing the first computer. The method further includes executing the third algorithm utilizing the first computer based on either the input data received from the second algorithm or other data received from the second computer.

A system for executing a plurality of algorithms in accordance with another exemplary embodiment is provided. The system includes a first computer configured to associate a first algorithm of the first computer with a second algorithm of the second computer. The first computer is further configured to execute the first algorithm based on either input data received from the second algorithm or other data received from the second computer. The first computer is further configured to associate a third algorithm of the first computer with the second algorithm of the second computer. The first computer is further configured to execute the third algorithm based on either the input data received from the second algorithm or other data received from the second computer.

DESCRIPTION OF EXEMPLARY EMBODIMENTS

Figure 1:
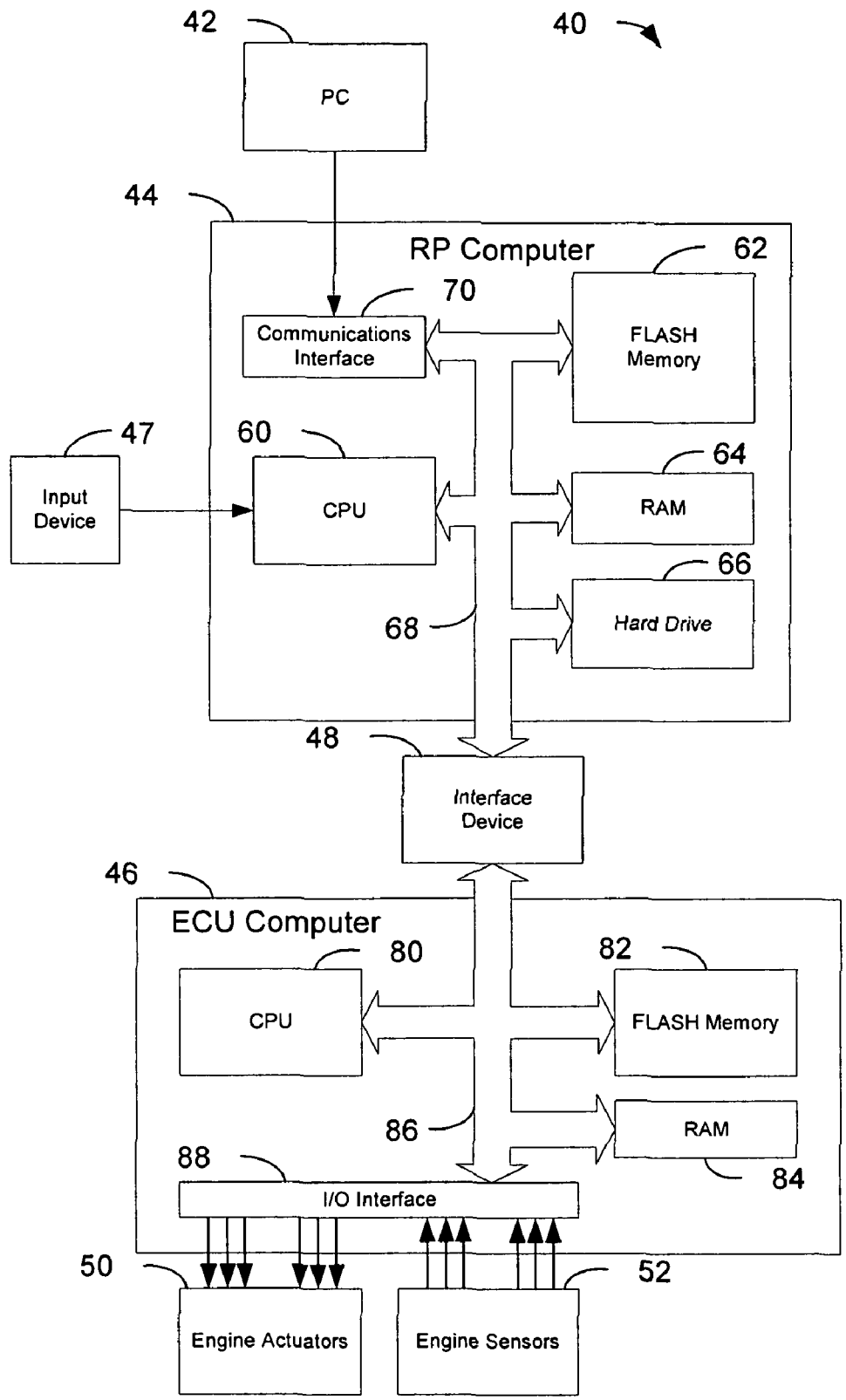
FIG. 1 is a block diagram of a rapid prototyping computer system having a rapid prototyping (RP) computer and an electronic control unit (ECU) computer in accordance with an exemplary embodiment.
Figure 2:
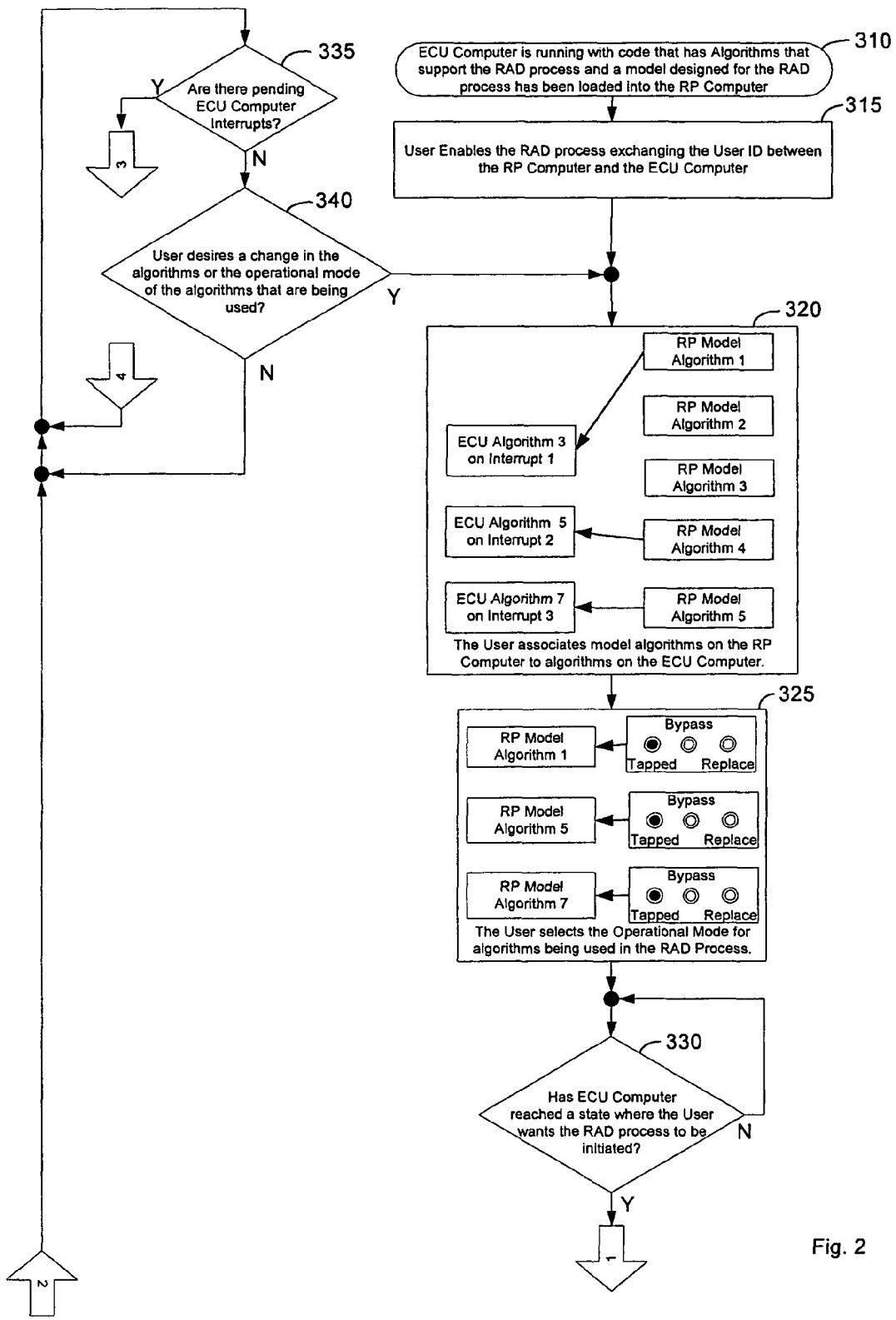
FIGS. 2-5 are flowcharts of a rapid algorithm development (RAD) method that is executed on the RP computer.
Figure 3:
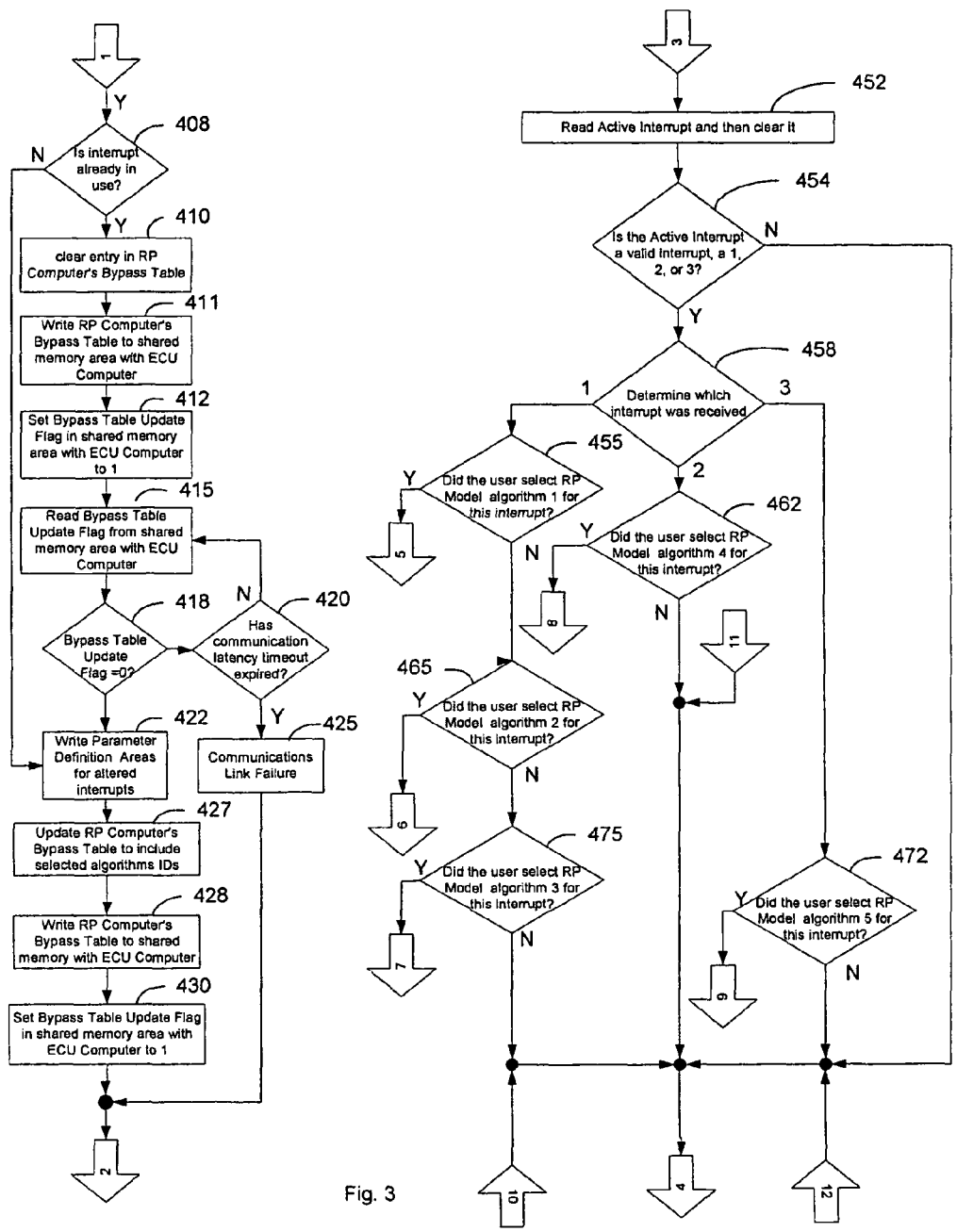
Figure 4:
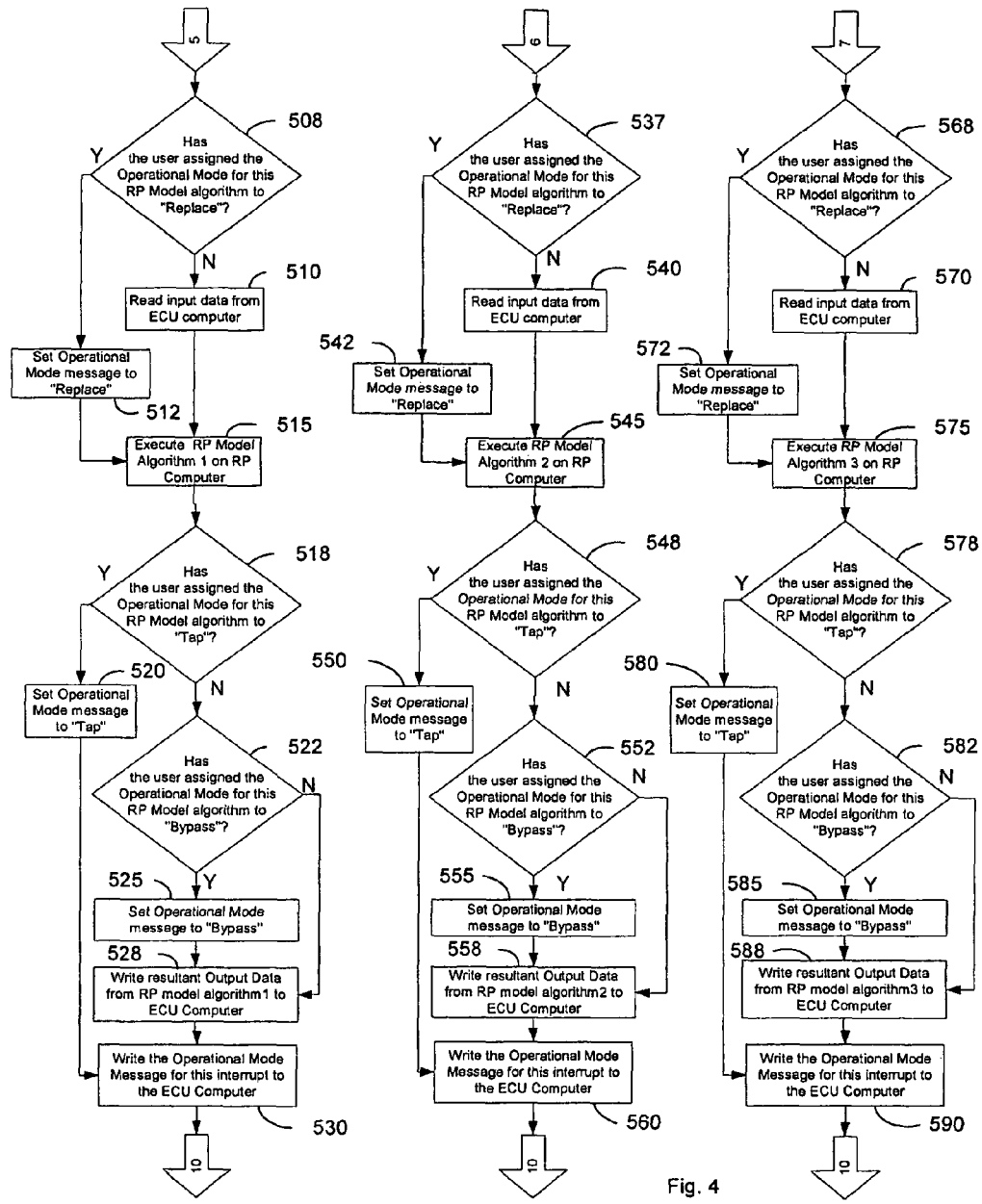
Figure 5:
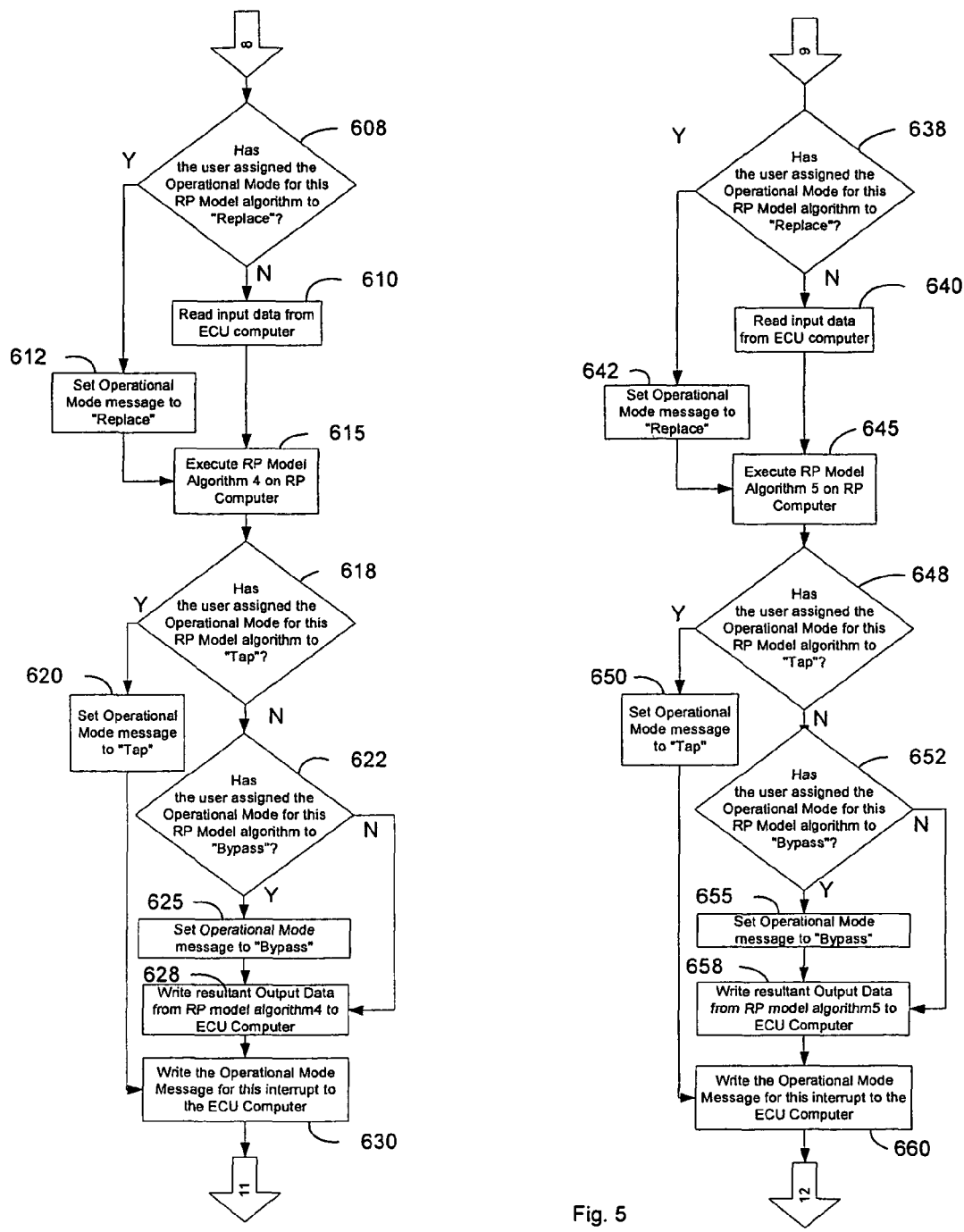
Figure 6:
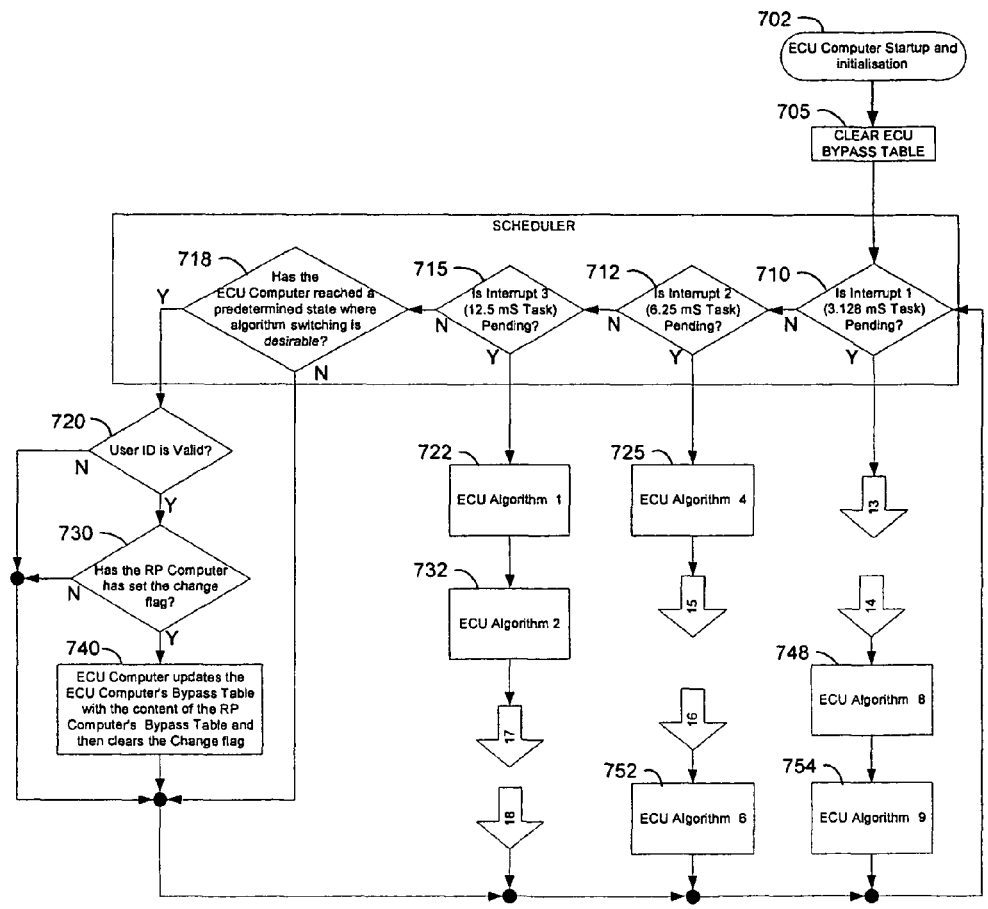
FIGS. 6-9 are flowcharts of a rapid algorithm development (RAD) method that is executed on the ECU computer.
Figure 7:
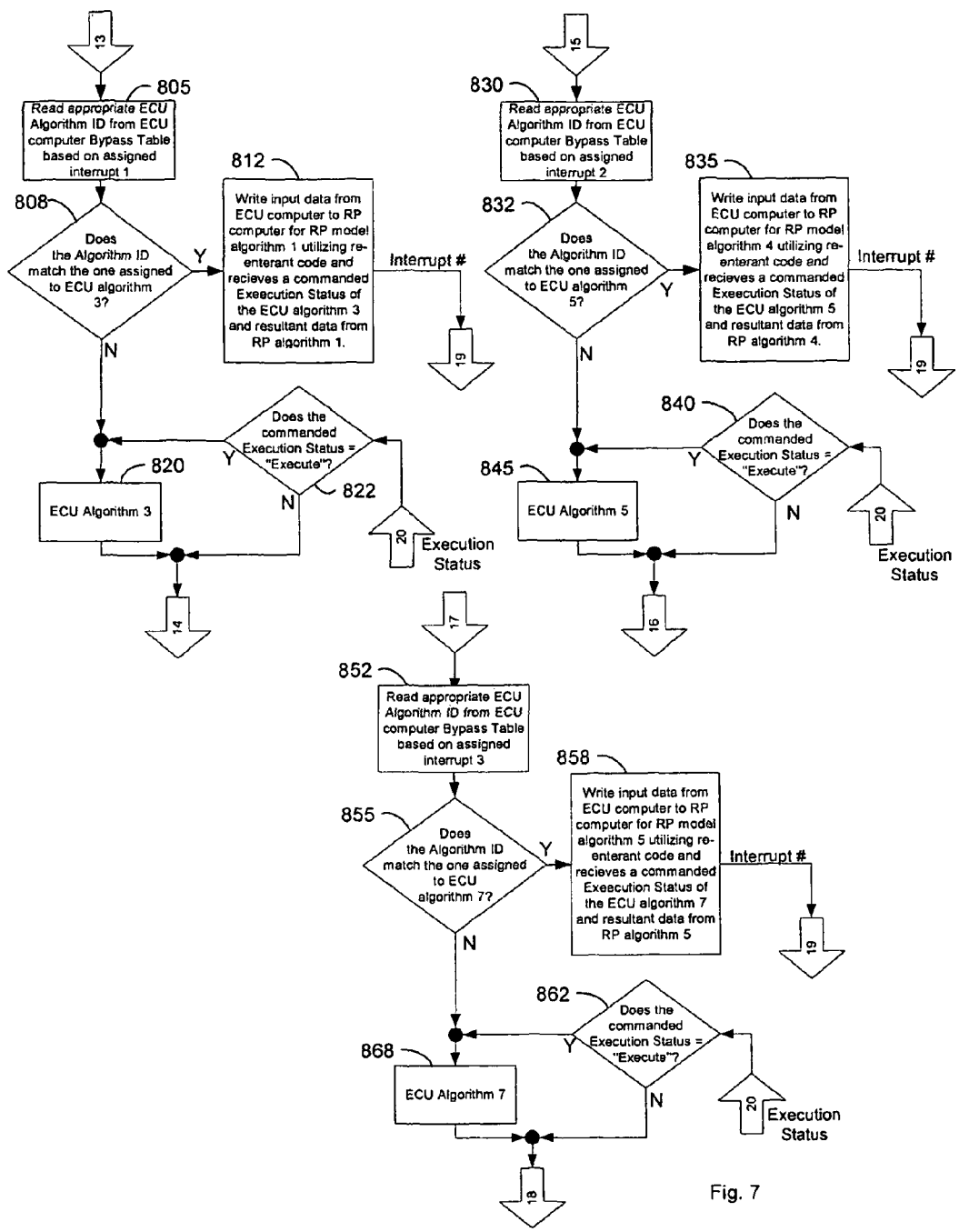
Figure 8:
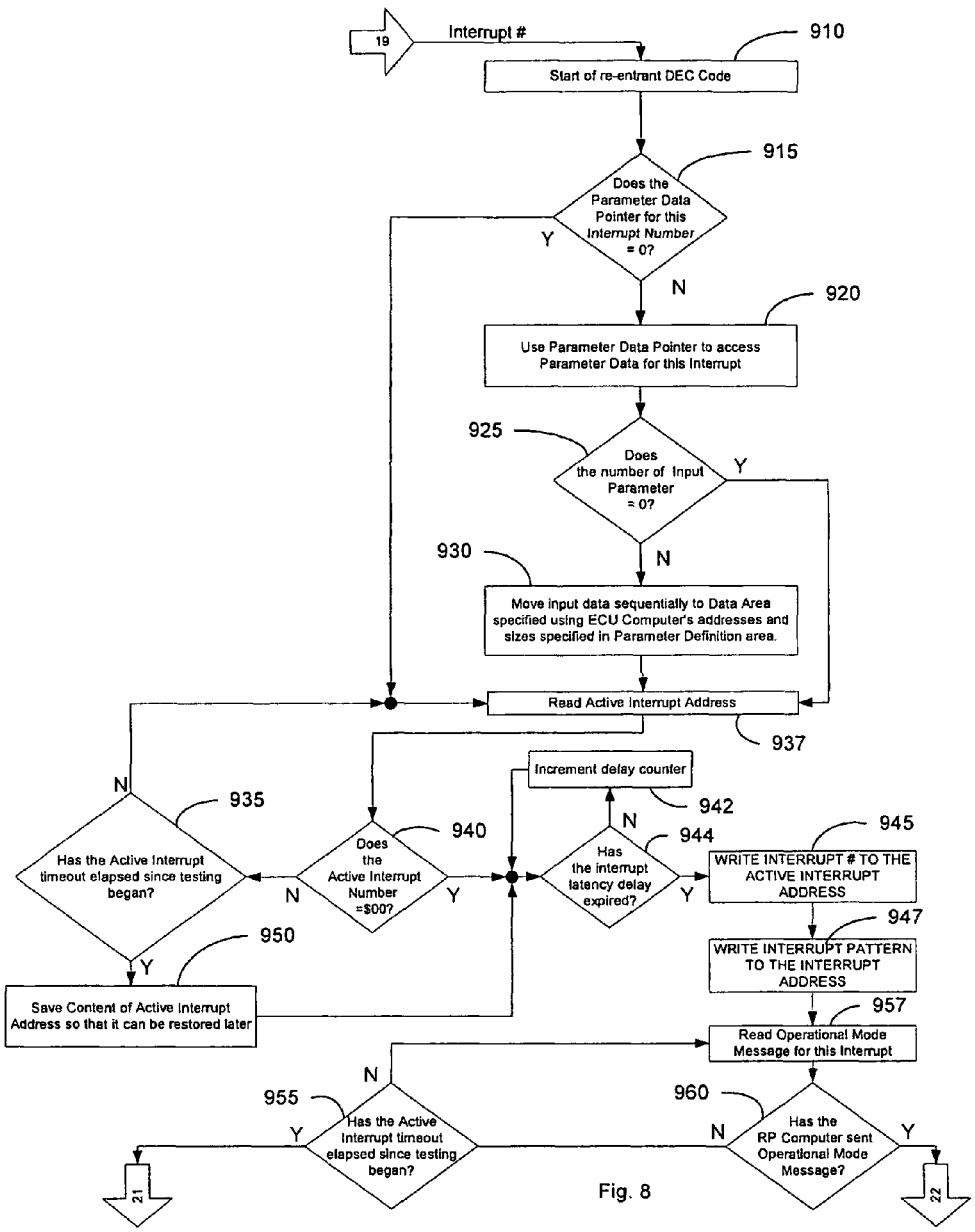
Figure 9:
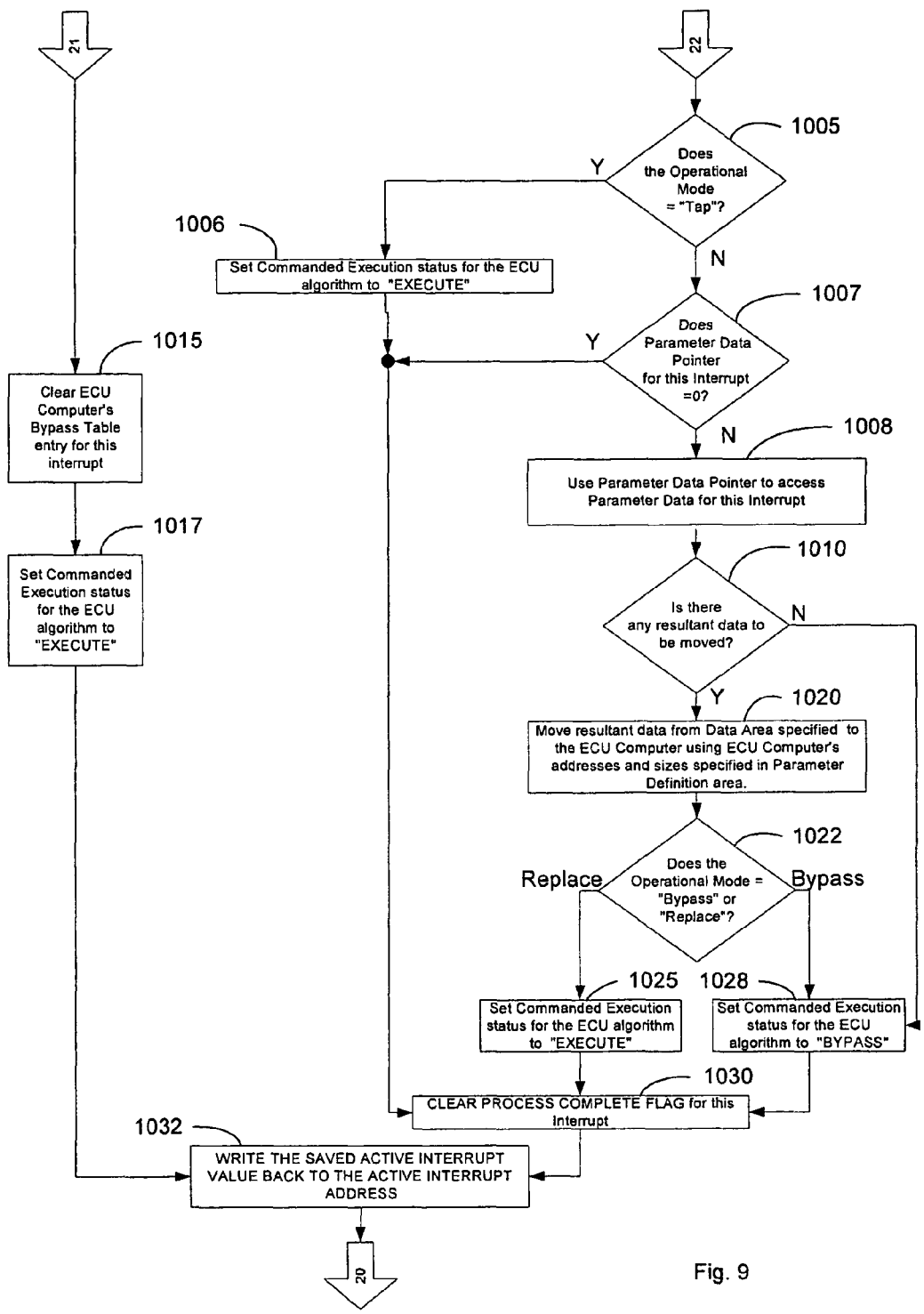

Referring to FIG. 1, a rapid prototyping computer system 40 for developing and testing software algorithms is illustrated. The system 40 includes a personal computer (PC) 42, the RP computer 44, the ECU computer 46, an input device 47, an interface device 48, engine actuators 50, and an engine sensors 52.

The PC 42 is provided to allow a user to develop software algorithms thereon. The PC 42 operatively communicates with a communication interface device 70 of the RP computer 44.

The RP computer 44 is provided to receive software algorithms from the PC 42 and to allow a user to associate RP model algorithms of the RP computer 44 with ECU algorithms of the ECU computer 46. Further, the RP computer 44 is configured to allow user to specify whether an ECU algorithm on the ECU computer 46 associated with an RP model algorithm will be executed in a bypass mode, a tap mode, a replace mode. Still further, the RP computer 44 is configured to execute a first rapid algorithm development (RAD) method comprising instructions that are stored in at least one of flash memory 62 and RAM 64, which is explained in greater detail below.

When an ECU algorithm on the ECU computer 46 has been selected by a user for bypass mode, instead of completely executing the ECU algorithm on the ECU computer 46, a RP model algorithm is executed on the RP computer 44 instead of the ECU algorithm on the ECU computer 46. Further, real-time input data received by the ECU computer 46 from sensors, such as engine sensors 52 for example, is routed to the RP computer 44 such that the RP model algorithm is stimulated with the real-time input data. Further, resultant data produced by the RP model algorithm is routed to the ECU computer 46 for controlling devices such as engine actuators 50 operably communicating with the ECU computer 46. Thus, the bypass mode allows an RP model algorithm on the RP computer 44 to be executed with real-time input data and further allows resultant data from the algorithm to be used by the ECU computer 46 to control devices operably coupled to the ECU computer 46.

When an ECU algorithm on the ECU computer 46 has been selected by a user for tap mode, instead of initially executing the ECU algorithm on the ECU computer 46, a RP model algorithm is executed on the RP computer 44. Further, real-time input data received by the ECU computer 46 from sensors, such as engine sensors 52 for example, is routed to the RP computer 44 such that the RP model algorithm is stimulated with the real-time input data. Further, the resultant data from the RP computer 44 is not utilized to control any devices operably communicating with the ECU computer 46. Upon completion of the execution of the RP model algorithm on the RP computer 44, the ECU algorithm on the ECU computer 46 is executed and the resultant data from the ECU algorithm is utilized to control devices operably communicating with the ECU computer 46. Thus, the tap mode allows a RP model algorithm on the RP computer 44 to be executed with real-time input data and further allows an operator to view resultant data from the RP model algorithm to determine how the algorithm responds to the real-time input data, without utilizing the resultant data to control devices.

When an ECU algorithm on the ECU computer 46 has been selected by a user for replace mode, instead of initially executing the ECU algorithm on the ECU computer 46, a RP model algorithm is executed on the RP computer 44. The RP model algorithm accesses predetermined or predefined input data from a memory or data that is available from the RP computer 44 and produces resultant data based on the predetermined input data. In other words, the RP model algorithm does not utilize real-time input data from the ECU computer 46. Further, the resultant data produced by the RP model algorithm of the RP computer 44 is routed to the ECU computer 46. After the RP model algorithm sends resultant data to the ECU algorithm, the ECU algorithm is executed. Thus, the replace mode allows a RP model algorithm executing on the RP computer 44 to utilize predefined input data (instead of real-time input data from the ECU algorithm) to determine how an algorithm responds to the predefined input data.

The RP computer 44 includes a central processing unit (CPU) 60, a flash memory 62, a random access memory 64, a hard drive 66, a bus 68, and a communication interface device 70. The CPU 60 is configured to execute a first RAD method stored in a least one of the flash memory 62, the RAM 64, and the hard drive 66. The CPU 60 operably communicates via the bus 68 with the flash memory 62, the RAM 64, the hard drive 66, and the communication interface device 70. The communication interface device 70 is operably coupled to the PC 42 and the bus 68 is operably coupled to the interface device 48. The CPU 60 communicates with the ECU computer 46 via the bus 68 and the interface device 48.

The input device 47 is provided to allow a user to input data that is received by the RP computer 44. In one exemplary embodiment, the input device 47 comprises a keyboard. In another exemplary embodiment, the input device 47 comprises a computer mouse.

The interface device 48 is provided to route data between the RP computer 44 and the ECU computer 46. The interface device 48 is operably coupled to both the bus 68 of the RP computer 44 and the bus 86 of the ECU computer 46.

The ECU computer 46 is provided to execute software algorithms in either bypass mode, tap mode, or replace mode, as specified by the RP computer 44. Further, the ECU computer 46 is configured to obtain real-time input data from the engine sensors 52 and to control engine actuators 50. The ECU computer 46 includes a central processing unit (CPU) 80, a flash memory 82, a random access memory 84, a bus 86, and an interface device 88. The CPU 80 is configured to execute a second RAD method comprising instructions stored in at least one of the flash memory 82, and the RAM 84, which will be explained in greater detail below. The CPU 80 operably communicates via the bus 86 with the flash memory 82, the RAM 84, and the interface device 88. The interface device 88 operably communicates with the engine actuators 50 and the engine sensors 52.

Referring to FIGS. 2-5, a rapid algorithm development (RAD) method that is executed on the RP computer 44 which communicates with a RAD method that is executed on the ECU computer 46 will now be explained.

At step 310, the ECU computer 46 is executing algorithms that support a RAD process of the ECU computer 46, and at least one RP algorithm model has been loaded in the memory of the RP computer 44.

At step 315, a user inputs a user ID utilizing the input device 47 that is received by the RP computer 44. Thereafter, the user ID is transmitted from the RP computer 44 to the ECU computer 46. If the ECU computer 46 validates the user ID as a valid user ID, the ECU computer 46 will allow the RP computer 44 to specify operational modes associated with ECU algorithms executed by the ECU computer 46. Otherwise, the ECU computer 46 will not allow the RP computer 44 to specify operational modes associated with ECU algorithms executed by the ECU computer 46.

At step 320, the user associates RP model algorithms of the RP computer 44 with ECU algorithms of the ECU computer 46, utilizing the input device 47. For example, the user associates the RP model algorithm 1 to the ECU algorithm 3, the RP model algorithm 4 to the ECU algorithm 5, and the RP model algorithm 5 to the ECU algorithm 7. Thereafter, the selected ECU algorithm IDs are stored in an ECU bypass table. It should be further noted that the user could have alternately associated at least two RP model algorithms with each ECU algorithm.

At step 325, the user selects the operational modes for the RP model algorithms being utilized in the RAD method, utilizing the input device 47. For example, the user selects a tap mode for RP model algorithm 1 associated with ECU algorithm 3, a tap mode for RP model algorithm 5 associated with ECU algorithm 5, and a tap mode for RP model algorithm 7 associated with ECU algorithm 7.

At step 330, the RP computer 44 makes a determination as to whether the ECU computer 46 has reached a state where the user wants the RAD method on the ECU computer 46 is to be initiated. If the value of step 330 equals "yes", the method advances to step 408. Otherwise, the method returns to step 330.

At step 408, the RP computer 44 makes a determination as to whether an interrupt number is already in use. If the value of step 408 equals "yes", the method advances to step 410. Otherwise, the method advances to step 422.

At step 410, the RP computer 44 clears an entry in an RP computer bypass table. The RP computer bypass table is a table listing ECU algorithms to be bypassed.

At step 411, the RP computer 44 writes the RP computer bypass table to a shared memory area with the ECU computer 46.

At step 412, the RP computer 44 sets a bypass table update flag in the shared memory area with the ECU computer 46, equal to "1".

At step 415, the RP computer 44 reads the bypass table update flag in the shared memory area with the ECU computer 46, and thereafter waits for the ECU computer 46 to clear the flag indicating command completion.

At step 418, the RP computer 44 makes a determination as to whether the bypass table update flag is equal to "0". If the value of step 418 equals "yes", the method advances to step 422. Otherwise, the method advances to step 420.

At step 422, the RP computer 44 writes data associated with the altered interrupts to a parameter definition area in a memory. The parameter definition area is a table describing the input data and the resultant data (i.e., output data) for each executing algorithm.

At step 427, the RP computer 44 updates the RP computer bypass table to include the selected ECU algorithm IDs.

At step 428, the RP computer 44 writes the RP computer bypass table to a shared memory with the ECU computer 46. In one exemplary embodiment, the shared memory is located in the RAM 82. In another exemplary embodiment, the shared memory is located in the interface device 48.

At step 430, the RP computer 44 sets a bypass table update flag in shared memory area with ECU computer 46, equal to "1." After step 430, the method advances to step 335.

Referring again to step 418, the RP computer 44 makes a determination as to whether the bypass table update flag is equal to "0". If the value of step 418 equals "no", the method advances to step 420.

At step 420, the RP computer 44 makes a determination as to whether a timeout interval, associated with performing steps 418, 420, and 415, is greater than a predetermined threshold timeout period. If the value of step 420 equals "yes", the method advances to step 425. Otherwise, the method returns to step 415.

At step 425, the RP computer 44 indicates that a communication link failure has occurred with the ECU computer 46. After step 425, the method advances to step 335.

At step 335, the RP computer 44 makes a determination as to whether there are any pending interrupts from the ECU computer 46. If the value of step 335 equals "yes", the method advances to step 452. Otherwise, the method advances to step 340.

At step 340, the RP computer 44 makes a determination as to whether the user desires a change in the algorithms or a change in the operational modes of the algorithms that are being used. For example, if the user has determined that an RP algorithm is operating as expected, the user may want to switch the ECU algorithm and the associated RP model algorithm from operating in tapped mode to bypass mode. Further, the user could desire to use a different RP model algorithm with the ECU algorithm that is currently being bypassed. If the value of step 340 equals "yes", then the method advances to step 320. Otherwise, the method returns to step 335.

Referring again to step 335, if the value of step 335 equals "yes", the method advances to step 452. At step 452, the RP computer 44 reads an active interrupt number and then clears the interrupt number from an interrupt memory location.

At step 454, the RP computer 44 makes a determination as to whether a valid interrupt number (e.g., interrupt number 1, 2, or 3) was received. If the value of step 454 equals "yes", the method advances to step 458. Otherwise, the method advances to step 335.

At step 458, the RP computer 44 makes a determination as to which interrupt number was received. If an interrupt number "1" was received, the method advances to step 455. If an interrupt number "2" was received, the method advances to step 462. If an interrupt number "3" was received, the method advances to step 472.

At step 455, the RP computer 44 makes a determination as to whether the user selected the RP model algorithm 1 for interrupt number "1." If the value of step 455 equals "yes", the method advances to step 508. Otherwise, the method advances to step 465.

At step 508, the RP computer 44 makes a determination as to whether the user has assigned the operational mode for RP model algorithm 1 to replace mode. If the value of step 508 equals "yes", the method advances to step 512. Otherwise, the method advances to step 510.

At step 512, the RP computer 44 sets an operational mode message to "replace." After step 510, the method advances to step 515.

Referring again to step 508, if the value of step 508 equals "no", the method advances to step 510. At step 510, the RP computer 44 reads input data from the ECU computer 46. It should be noted that the input was previously received by the ECU computer 46 from the engine sensors 52. After step 510, the method advances to step 515.

At step 515, the RP computer 44 executes the RP model algorithm 1 utilizing the input data.

At step 518, the RP computer 44 makes a determination as to whether the user has assigned an operational mode of the RP model algorithm 1 to tap mode. If the value of step 518 equals "yes", the method advances to step 520. Otherwise, the method advances to step 522.

At step 520, the RP computer 44 sets an operational mode message equal to "tap." After step 520, the method advances to step 530.

Referring again to step 518, if the value of step 518 equals "no", the method advances to step 522. At step 522, the RP computer 44 makes a determination as to whether the user has assigned an operational mode of RP model algorithm 1 to bypass mode. If the value of step 522 equals "yes", the method advances to step 525. Otherwise, the method advances to step 528.

At step 525, the RP computer 44 sets an operational mode message to "bypass." After step 525, the method advances to step 528.

At step 528, the RP computer 44 writes resultant output data from the RP model algorithm 1 to the ECU computer 46.

At step 530, the RP computer 44 writes the operational mode message for the interrupt number "1" to the ECU computer 44. After step 530, the method returns to step 335.

Referring again to step 455, when the value of step 455 equals "no", the method advances to step 465. At step 465, the RP computer 44 makes a determination as to whether the user selected the RP model algorithm 2 for interrupt number "1." If the value of step 465 equals "yes", the method advances to step 537. Otherwise, the method advances to step 475.

At step 537, the RP computer 44 makes a determination as to whether the user has assigned the operational mode for RP model algorithm 2 to replace mode. If the value of step 537 equals "yes", the method advances to step 542. Otherwise, the method advances to step 540.

At step 542, the RP computer 44 sets an operational mode message equal to "replace." After step 542, the method advances to step 545.

Referring again to step 537, if the value of step 537 equals "no", the method advances to step 540. At step 540, the RP computer 44 reads input data from the ECU computer 46. After step 540, the method advances to step 545.

At step 545, the RP computer 44 executes the RP model algorithm 2 utilizing the input data from the ECU computer 46.

At step 548, the RP computer 44 makes a determination as to whether the user has assigned an operational mode of the RP model algorithm 2 to tap mode. If the value of step 548 equals "yes", the method advances to step 550. Otherwise, the method advances to step 552.

At step 550, the RP computer 44 sets an operational mode message equal to "tap." After step 550, the method advances to step 560.

Referring again to step 548, if the value of step 548 equals "no", the method advances to step 552. At step 552, the RP computer 44 makes a determination as to whether the user has assigned an operational mode of RP model algorithm 2 to bypass mode. If the value of step 552 equals "yes", the method advances to step 555. Otherwise, the method advances to step 558.

At step 555, the RP computer 44 sets an operational mode message equal to "bypass." After step 555, the method advances to step 558.

At step 558, the RP computer 44 writes resultant output data produced by the RP model algorithm 2 to the ECU computer 46.

At step 560, the RP computer 44 writes the operational mode message for the interrupt number "1" to the ECU computer 44. After step 560, the method returns to step 335.

Referring again to step 465, when the value of step 465 equals "no", the method advances to step 475. At step 475, the RP computer 44 makes a determination as to whether the user selected the RP model algorithm 3 for interrupt number "1." If the value of step 475 equals "yes", the method advances to step 568. Otherwise, the method advances to step 335.

At step 568, the RP computer 44 makes a determination as to whether the user has assigned the operational mode for RP model algorithm 3 to replace mode. If the value of step 568 equals "yes", the method advances to step 572. Otherwise, the method advances to step 570.

At step 572, the RP computer 44 sets an operational mode message equal to "replace." After step 572, the method advances to step 575.

Referring again to step 568, if the value of step 568 equals "no", the method advances to step 570. At step 570, the RP computer 44 reads input data from the ECU computer 46. After step 570, the method advances to step 575.

At step 575, the RP computer 44 executes the RP model algorithm 3 utilizing the input data from the ECU computer 46.

At step 578, the RP computer 44 makes a determination as to whether the user has assigned an operational mode of the RP model algorithm 3 to tap mode. If the value of step 578 equals "yes", the method advances to step 580. Otherwise, the method advances to step 582.

At step 580, the RP computer 44 sets an operational mode message equal to "tap." After step 580, the method advances to step 590.

Referring again to step 578, if the value of step 548 equals "no", the method advances to step 582. At step 582, the RP computer 44 makes a determination as to whether the user has assigned an operational mode of RP model algorithm 3 to bypass mode. If the value of step 582 equals "yes", the method advances to step 585. Otherwise, the method advances to step 588.

At step 585, the RP computer 44 sets an operational mode message equal to "bypass." After step 585, the method advances to step 588.

At step 588, the RP computer 44 writes resultant output data produced by the RP model algorithm 3 to the ECU computer 46.

At step 590, the RP computer 44 writes the operational mode message for the interrupt number "1" to the ECU computer 44. After step 590, the method returns to step 335.

Referring again to step 458, when the interrupt number "2" was received, the method advances to step 462. At step 462, the RP computer 44 makes a determination as to whether the user selected the RP model algorithm 4 for the interrupt number "2." If the value of step 462 equals "yes", the method advances to step 608. Otherwise, the method returns to step 335.

At step 608, the RP computer 44 makes a determination as to whether the user has assigned the operational mode for RP model algorithm 4 to replace mode. If the value of step 608 equals "yes", the method advances to step 612. Otherwise, the method advances to step 610.

At step 612, the RP computer 44 sets an operational mode message equal to "replace." After step 612, the method advances to step 615.

Referring again to step 608, if the value of step 608 equals "no", the method advances to step 610. At step 610, the RP computer 44 reads input data from the ECU computer 46. After step 610, the method advances to step 615.

At step 615, the RP computer 44 executes the RP model algorithm 4 utilizing the input data At step 618, the RP computer 44 makes a determination as to whether the user has assigned an operational mode of the RP model algorithm 4 to tap mode. If the value of step 618 equals "yes", the method advances to step 620. Otherwise, the method advances to step 622.

At step 620, the RP computer 44 sets an operational mode message equal to "tap." After step 620, the method advances to step 630.

Referring again to step 618, if the value of step 618 equals "no", the method advances to step 622. At step 622, the RP computer 44 makes a determination as to whether the user has assigned an operational mode of RP model algorithm 4 to bypass mode. If the value of step 622 equals "yes", the method advances to step 625. Otherwise, the method advances to step 628.

At step 625, the RP computer 44 sets an operational mode message equal to "bypass." After step 625, the method advances to step 628.

At step 628, the RP computer 44 writes resultant output data produced by the model algorithm to the ECU computer 46.

At step 630, the RP computer 44 writes the operational mode message for the interrupt to the ECU computer 44. After step 630, the method returns to step 335.

Referring again to step 458, when the interrupt number "3" was received, the method advances to step 472. At step 472, the RP computer 44 makes a determination as to whether the user selected the RP model algorithm 5 for the interrupt number "3." If the value of step 472 equals "yes", the method advances to step 638. Otherwise, the method returns to step 335.

At step 638, the RP computer 44 makes a determination as to whether the user has assigned the operational mode for RP model algorithm 5 to replace mode. If the value of step 638 equals "yes", the method advances to step 642. Otherwise, the method advances to step 640.

At step 642, the RP computer 44 sets an operational mode message to "replace." After step 642, the method advances to step 645.

Referring again to step 638, if the value of step 638 equals "no", the method advances to step 640. At step 640, the RP computer 44 reads input data from the ECU computer 46. After step 640, the method advances to step 645.

At step 645, the RP computer 44 executes the RP model algorithm 5 utilizing the input data from the ECU computer 46.

At step 648, the RP computer 44 makes a determination as to whether the user has assigned an operational mode of the RP model algorithm 5 to tap mode. If the value of step 648 equals "yes", the method advances to step 650. Otherwise, the method advances to step 652.

At step 650, the RP computer 44 sets an operational mode message equal to "tap." After step 650, the method advances to step 660.

Referring again to step 648, if the value of step 648 equals "no", the method advances to step 652. At step 652, the RP computer 44 makes a determination as to whether the user has assigned an operational mode of RP model algorithm 5 to bypass mode. If the value of step 652 equals "yes", the method advances to step 655. Otherwise, the method advances to step 658.

At step 655, the RP computer 44 sets an operational mode message equal to "bypass." After step 655, the method advances to step 658.

At step 658, the RP computer 44 writes resultant output data produced by the model algorithm to the ECU computer 46.

At step 660, the RP computer 44 writes the operational mode message for the interrupt number "3" to the ECU computer 44. After step 660, the method returns to step 335.

Referring to FIGS. 6-9, a rapid algorithm development (RAD) method that is executed on the ECU computer 46 that communicates with a RAD method that is executed on the RP computer 44 will now be explained.

At step 702, the ECU computer 46 is operating and initialized.

At step 705, the ECU computer 46 clears the ECU computer bypass table.

At step 710, the ECU computer 46 makes a determination as to whether an interrupt number "1" is pending. If the value of step 710 equals "yes", the method advances to step 805. Otherwise, the method advances to step 712.

At step 805, the ECU computer 46 reads an appropriate ECU algorithm ID from the ECU computer bypass table based on the interrupt number "1."

At step 808, the ECU computer 46 makes a determination as to whether the ECU algorithm ID from the ECU computer bypass table matches the ID associated with ECU algorithm 3. If the value of step 808 equals "yes", the method advances to step 812. Otherwise, the method advances to step 820.

At step 812, the ECU computer 46 writes input data to the RP computer 44 for the RP model algorithm 1, and the ECU computer 46 receives resultant data from the RP model algorithm 1 and a commanded execution status for the ECU algorithm 3, utilizing re-enterant code. The resultant data received from the RP model algorithm 1 is utilized by the ECU computer 46 to control engine actuators 50. The step 812 is implemented utilizing steps 910-960 and steps 1005-1032 which will now be explained. The 910-960 and steps 1005-1032 are implemented utilizing re-entrant code which means that multiple instances of the code can be executing at one time.

At step 910, the ECU computer 46 commences executing the re-entrant code.

At step 915, the ECU computer 46 makes a determination as to whether the parameter data pointer for the received interrupt is equal to "0" indicating that no input data is to be transferred to the RP computer 44. If the value of step 915 equals "yes", the method advances to step 937. Otherwise, the method advances to step 920.

At step 920, the ECU computer 46 utilizes the parameter data pointer to access parameter data associated with the received interrupt number. It should be noted that the parameter data can comprise input data or resultant output data. Further, each ECU algorithm has an associated parameter data pointer set up in step 422.

At step 925, the ECU computer 46 makes a determination as to whether the number of input parameter data equals "0." If the value of step 925 equals "yes", the method advances to step 937. Otherwise, the method advances to step 930.

At step 930, the ECU computer 46 moves input data sequentially to a data area specified using ECU computer addresses and sizes specified in a parameter definition area.

At step 937, the ECU computer 46 reads the active interrupt address.

At step 940, the ECU computer 46 makes a determination as to whether the active interrupt number equals "$00" indicating that no other instances of re-entrant code are accessing the interrupt location. It should be noted that the active interrupt number can be written in step 945 in previous iterations of the re-entrant code. If the value of step 940 equals "yes", the method advances to step 944. Otherwise, the method advances to step 935.

At step 944, the ECU computer 46 makes a determination as to whether a minimum time interval has expired measured from a time when the active interrupt was previously interrogated as "$00." If the value of step 944 equals "yes", the method advances in step 945. Otherwise, the method advances to step 942.

At step 942, the ECU computer 46 increments a delay counter. After step 942, the method returns to step 944.

At step 945, the ECU computer 46 writes the interrupt number to the active interrupt address.

At step 947, the ECU computer 46 writes an interrupt pattern to the interrupt address. It should be noted that the interrupt pattern is a predefined ID that is written to the interrupt address to induce an interrupt handler to generate an interrupt. It is a specific pattern to protect against accidental access or malicious access to the ECU algorithms.

At step 957, the ECU computer 46 reads an operational mode message for the interrupt number.

At step 960, the ECU computer 46 makes a determination as to whether the RP computer 44 has sent a complete flag. If the value of step 960 equals "no", the method advances to the step 955. Otherwise, the method advances to the step 1005.

At step 955, the ECU computer 46 makes a determination as to whether a time interval associated with an instance of the re-entrant code being executed, is greater than a threshold time interval. If the value of step 955 equals "yes", the method advances to step 1015. Otherwise, the method returns to step 957.

Referring again to step 940, when the value step 940 equals "no", the method advances to step 935. At step 935, the ECU computer 46 makes a determination as to whether a time interval associated with an instance of the re-entrant code being executed, is greater than a threshold time interval. If the value of step 935 equals "yes", the method advances to step 950. Otherwise, the method returns to step 937.

At step 950, the ECU computer 46 saves the content at the active interrupt address so that it can be restored at a later time. It should be noted that at this point in time, because the active interrupt is not idle (i.e., not equal to 0), and the current interrupt number is of a higher priority than a stored interrupt number, it is desirable to interrupt the RP computer 44 which is processing the interrupt number located in the active interrupt address. Thereafter, the current interrupt number is stored at the active interrupt address thereby labeling the interrupt priority focus for the subsequent service request. After step 950, the method returns to step 944.

Referring again to step 960, when the value of step 960 equals "yes", the method advances to step 1005. At step 1005, the ECU computer 46 makes a determination as to whether the operational mode message was set equal to "tap" for this interrupt. If the value of step 1005 equals "yes", the method advances to step 1006. Otherwise, the method advances to 1007.

At step 1006, the RP computer 44 sets a commanded execution status for the ECU algorithm to "execute." After step 1006, the method advances to step 1030.

Referring again to step 1005, when the value of step 1005 equals "no", the method advances to step 1007. At step 1007, the ECU computer 46 makes a determination as to whether a parameter data pointer for the current interrupt number is equal to "0" indicating that there is not any resultant output data to be received from the RP computer 44. If the value of step 1007 equals "yes", the method advances to step 1030. Otherwise, the method advances to step 1008.

At step 1008, the ECU computer 46 uses the parameter data pointer to access parameter data for the current interrupt number. It should be noted that the parameter data pointer is a complex pointer with sub-elements which are also pointers. These sub-pointers point to input data (to the RP computer 44) and resultant output data (from the RP computer 44). If input data exists (see step 915) then the input parameter sub-pointer will be non-zero and if resultant output data exists (see step 1007), then the output parameter sub-pointer will be non-zero.

At step 1010, the ECU computer 46 makes a determination as to whether there is any resultant data to be moved.

At step 1020, the ECU computer 46 moves resultant data from a data area specified by the ECU computer 46 using computer addresses and sizes specified in a parameter definition area.

At step 1022, the ECU computer 46 makes a determination as to whether the operational mode message was set equal to either "bypass" or "replace" for this interrupt. If the operational mode message is set equal to "replace", the method advances to step 1025. Otherwise, if the operational mode message is set equal to "bypass", the method advances to step 1028.

At step 1025, the ECU computer 46 sets a commanded execution status for an ECU algorithm equal to "execute."

At step 1030, ECU computer 46 clears a process complete flag for the current interrupt number.

At step 1032, ECU computer 46 writes the saved active interrupt number back to the active interrupt address. It should be noted that after completion of a high priority interrupt algorithm by the RP computer 44, the ECU computer 46 restores the previous interrupt number at the active interrupt address for any additional frame processing in the context of the lower priority RP model algorithm which was interrupted. Once this restoration is complete, this instance of the interrupt handler (beginning in step 910) can end which will then return to any previous instance of the interrupt handler to continue with the same ECU algorithm sequence until it also ends. After step 1032, the method advances to step 822.

Referring again to step 1022, if the operational mode message is set equal to "bypass", the method advances to step 1028. At step 1028, the ECU computer 46 sets a commanded execution status for an ECU algorithm to "bypass." After step 1028, the method advances to step 1030 discussed above.

Referring again to step 955, when a value of step 955 equals "yes", indicating a time interval associated with an instance of the re-entrant code being executed, is greater than a threshold time interval, the method advances to step 1015.

At step 1015, the ECU computer 46 clears an ECU computer bypass table entry for the current interrupt number.

At step 1017, the ECU computer sets a commanded execution status for an ECU algorithm to "execute." After step 1017, the method advances to step 1032 discussed above.

Referring again to step 812, upon completion of step 812 the method advances to step 822. At step 822, the ECU computer 46 makes a determination as to whether the commanded execution status received from the RP computer 44 equals "execute." If the value of step 822 equals "yes", the method advances to step 820. Otherwise, the method returns to step 748.

At step 820, the ECU computer 46 executes the ECU algorithm 3. After step 820, the method advances to step 748.

At step 748, the ECU computer 46 executes the ECU algorithm 8.

At step 754, the ECU computer executes the ECU algorithm 9. After step 754, the method advances to step 710.

Referring again to step 710, if the value of step 710 equals "no", the method advances to step 712. At step 712, the ECU computer 46 makes a determination as to whether an interrupt number "2" is pending. If the value of step 712 equals "yes", the method advances to step 725. Otherwise, the method advances to step 715.

At step 725, the ECU computer 46 executes the ECU algorithm 4. After step 725, the method advances to step 830.

At step 830, the ECU computer 46 reads an appropriate ECU algorithm ID from the ECU computer bypass table based on the interrupt number "2."

At step 832, the ECU computer 46 makes a determination as to whether the ECU algorithm ID from the ECU computer bypass table matches the ID associated with ECU algorithm 5. If the value of step 832 equals "yes", the method advances to step 835. Otherwise, the method advances to step 845.

At step 835, the ECU computer 46 writes input data to the RP computer 44 for the RP model algorithm 4 to utilize during execution, and the ECU computer 46 receives resultant data from the RP model algorithm 4 and a commanded execution status for the ECU algorithm 5, utilizing re-enterant code. The step 835 is implemented utilizing steps 910-960 and steps 1005-1032 described above. After step 836, the method advances to step 840.

At step 840, the ECU computer 46 makes a determination as to whether the commanded execution status received from the RP computer 44 equals "execute." If the value of step 840 equals "yes", the method advances to step 845. Otherwise, the method returns to step 752.

At step 845, the ECU computer 46 executes the ECU algorithm 5. After step 820, the method advances to step 752.

At step 752, the ECU computer 46 executes the ECU algorithm 6. After step 752, the method advances to step 710.

Referring again to step 712, if the value of step 712 equals "no", the method advances to step 715. At step 715, the ECU computer 46 makes a determination as to whether an interrupt number "3" is pending. If the value of step 712 equals "yes", the method advances to step 722. Otherwise, the method advances to step 718.

At step 722, the ECU computer 46 executes the ECU algorithm 1.

At step 732, the ECU computer 46 executes the ECU algorithm 2. After step 732, the method advances to step 852.

At step 852, the ECU computer 46 reads an appropriate ECU algorithm ID from the ECU computer bypass table based on the interrupt number "3."

At step 855, the ECU computer 46 makes a determination as to whether the ECU algorithm ID from the ECU computer bypass table matches the ID associated with ECU algorithm 7. If the value of step 855 equals "yes", the method advances to step 858. Otherwise, the method advances to step 868.

At step 858, the ECU computer 46 writes input data to the RP computer 44 for the RP model algorithm 5 to utilize during execution, and the ECU computer 46 receives resultant data from the RP model algorithm 5 and a commanded execution status for the ECU algorithm 7, utilizing re-enterant code. The step 858 is implemented utilizing steps 910-960 and steps 1005-1032 described above. After step 858, the method advances to step 862.

At step 862, the ECU computer 46 makes a determination as to whether the commanded execution status received from the RP computer 44 equals "execute." If the value of step 862 equals "yes", the method advances to step 868. Otherwise, the method returns to step 710.

At step 868, the ECU computer 46 executes the ECU algorithm 7. After step 868, the method advances to step 710.

Referring again to step 715, if the value of step 715 equals "no", the method advances to step 718. At step 718, the ECU computer 46 makes a determination as to whether the computer 46 has reached a predetermined state where algorithm switching is desirable. For example, in one exemplary embodiment, the predetermined state occurs when no pending interrupts are present and the ECU computer 46 is in an idle software loop. In another exemplary embodiment, the predetermined state occurs during execution of a lowest priority interrupt task. If the value of step 718 equals "yes", the method advances to step 720. Otherwise, the method returns to step 710.

At step 720, the ECU computer 46 makes a determination as to whether a user ID entered by a user of the RP computer 44, utilizing an input device 47, is valid. In particular, the ECU computer 46 compares the user ID to a list of authorized user IDs to determine whether the user ID is valid. If the value of step 720 equals "yes", the method advances to step 730. Otherwise, the method returns to step 710.

At step 730, the ECU computer 46 makes a determination as to whether the RP computer 44 has set a bypass table update flag (also referred to as a "change flag" herein) equal to a "true" value. If the value of step 730 equals "yes", the method advances to step 740. Otherwise, the method returns to step 710.

At step 740, the ECU computer 46 updates the ECU computer bypass table with the contents of the RP computer bypass table and then clears the bypass table update flag. After step 740, the method returns to step 710.

The system and method described above provide a substantial advantage over other systems and methods. In particular, the system and method provide a technical effect of bypassing execution of an algorithm on an ECU computer when the ECU computer has a predetermined state and executing an associated algorithm on the RP computer to allow testing of the algorithm on the RP computer with data received from the ECU computer. Further, the system and method provide a technical effect of allowing operational modes of an algorithm on the ECU computer and an algorithm on the RP computer to be set by a user, when a user ID is valid and an algorithm ID is valid. Further, the system and method provide a technical effect of allowing an operational mode of an algorithm to be quickly changed between a tap mode and a bypass mode. Still further, the system and method provide a technical effect of synchronously executing a first plurality of algorithms on the ECU computer and a second plurality of algorithms on the RP computer and stimulating the second plurality of algorithms on the RP computer with input data from the first plurality of algorithms. Still further, the system and method provide a technical effect of synchronously executing both a first algorithm on the ECU computer and one selected algorithm of a second plurality of algorithms on the RP computer, wherein the second plurality of algorithms are associated with the first algorithm, and the selected algorithm utilizes input data from the first algorithm.

As described above, the above-described method can be embodied in the form of computer-implemented processes and apparatuses for practicing those processes. In an exemplary embodiment, the method is embodied in computer program code executed by one or more elements. The present method may be embodied in the form of computer program code containing instructions embodied in tangible media, such as floppy diskettes, CD-ROMs, hard drives, flash memory, or any other computer-readable storage medium, wherein, when the computer program code is loaded into and executed by a computer, the computer becomes an apparatus for practicing the invention. The present method can also be embodied in the form of computer program code, for example, whether stored in a storage medium, loaded into and/or executed by a computer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for setting operational modes of first and second algorithms, comprising:

transmitting a first message having a user ID and an algorithm ID from a first computer to a second computer, the user ID identifying the user, the algorithm ID identifying the second algorithm;

accessing a message transmission indicator indicating that the first message was transmitted from the first computer, utilizing the second computer;

comparing the user ID to a list of authorized user IDs to determine whether the user ID is valid;

comparing the algorithm ID to a list of valid algorithm IDs to determine whether the algorithm ID is valid;

setting the operational mode of the first algorithm associated with the first computer to a predetermined operational mode when the user ID is valid and the algorithm ID is valid; and setting the operational mode of the second algorithm associated with the second computer to the predetermined operational mode when the user ID is valid and the algorithm ID is valid; wherein the predetermined operational mode comprises a bypass mode; wherein execution of the second algorithm is bypassed, and the predetermined operational mode comprises a tap mode wherein the first algorithm is executed.

2. A system for setting operational modes of first and second algorithms, comprising:

a first computer configured to transmit a first message having a user ID and an algorithm ID to a second computer, the user ID identifying the user, the algorithm ID identifying the second algorithm;

the second computer configured to access a message transmission indicator indicating that the first message was transmitted from the first computer;

the second computer further configured to compare the user ID to a list of authorized user IDs to determine whether the user ID is valid;

the second computer further configured to compare the algorithm ID to a list of valid algorithm IDs to determine whether the algorithm ID is valid;

the first computer further configured to set the operational mode of the first algorithm associated with the first computer to a predetermined operational mode when the user ID is valid and the algorithm ID is valid; and the first computer further configured to set the operational mode of the second algorithm associated with the second computer to the predetermined operational mode when the user ID is valid and the algorithm ID is valid; wherein the predetermined operational mode comprises a bypass mode; wherein execution of the second algorithm is bypassed, and the predetermined operational mode comprises a tap mode wherein the first algorithm is executed.

3. A method for changing an operational mode of an algorithm between a tap mode and a bypass mode, comprising:

associating a first algorithm of a first computer with a second algorithm of a second computer, utilizing the first computer;

setting an operational mode of the first algorithm to the tap mode;

executing the first algorithm on the first computer wherein the first algorithm generates first resultant data that is observable, based on first input data;

executing the second algorithm on the second computer wherein the second algorithm generates second resultant data for controlling a device, based on either the first input data or second input data;

when the first resultant data satisfies predetermined criteria:

setting the operational mode of the first algorithm to the bypass mode; and executing the first algorithm on the first computer wherein the first algorithm generates third resultant data for controlling the device, based on the first input data.

4. A system for changing an operational mode of an algorithm between a tap mode and a bypass mode, comprising:

a first computer configured to associate a first algorithm of the first computer with a second algorithm of a second computer;

the first computer further configured to set an operational mode of the first algorithm to the tap mode;

the first computer further configured to execute the first algorithm wherein the first algorithm generates first resultant data that is observable, based on first input data;

the second computer configured to execute the second algorithm wherein the second algorithm generates second resultant data for controlling a device, based on either the first input data or second input data; and when the first resultant data satisfies predetermined criteria, the first computer further configured to set the operational mode of the first algorithm to the bypass mode, and to execute the first algorithm wherein the first algorithm generates third resultant data for controlling the device, based on the first input data.

* * * * *